United States Patent [19]

Brener et al.

[11] Patent Number: 5,729,017
[45] Date of Patent: Mar. 17, 1998

[54] TERAHERTZ GENERATORS AND DETECTORS

[75] Inventors: Igal M. Brener, Westfield, N.J.; Douglas Raymond Dykaar, Waterloo, Canada

[73] Assignee: Lucent Technologies Inc., Murray Hill, N.J.

[21] Appl. No.: 656,000

[22] Filed: May 31, 1996

[51] Int. Cl.$^6$ .................................. G01J 5/10; G01J 5/00
[52] U.S. Cl. ........................... 250/338.1; 250/493.1
[58] Field of Search ............................ 250/338.1, 493.1

[56] References Cited

PUBLICATIONS

Harde et al, "Coherent Transients Excited by Subpicosecond Pulses of Terahertz Radiation", J. Opt. Soc. Am. B, vol. 8, No. 8, Aug. 1991.

Primary Examiner—Carolyn E. Fields

[57] ABSTRACT

The specification describes pulse generators and detectors for the far infra-red and operating at frequencies of the order of $10^{10}$ to $10^{13}$ Hz (the Terahertz range). These devices rely on electric field interactions with optical beams in biased metal semiconductor microstructures. The electric field is created between metal electrodes on the semiconductor surface and the electric field is enhanced, according to the invention, by configuring the electrode gap geometry with sharp electrode features.

10 Claims, 3 Drawing Sheets

TERAHERTZ GENERATORS AND DETECTORS

FIELD OF THE INVENTION

This invention relates to devices for generating and receiving ultra high frequency radiation in the far infra-red. The devices rely on optoelectronic interactions for producing pulsed beams at frequencies of the order of $10^{10}$ to $10^{13}$ Hz. The upper end of this range is generally referred to as the terahertz range.

BACKGROUND OF THE INVENTION

Far infra-red pulsed beam devices operating in the $10^{10}$ to $10^{13}$ frequency regime have been described in various forms in the prior art. These pulsed devices have been used in time resolved infrared spectroscopy to characterize a variety of properties of solid state materials such as refractive index, photoconductivity, absorption, and dispersion. More recently, significant applications in optical imaging have become practical. Terahertz radiation imaging (T-ray imaging) shows promise in a variety of analytical imaging applications such as chemical mapping, and a host of commercial applications such as safe package inspection, industrial process control, food inspection, biology and medicine. As radiation sensors, these devices are effective for analysis of solids, liquids or gases. Analysis of gases is particularly effective since gases have characteristically strong absorption lines in the THz frequency range. Accordingly, these devices can be used effectively for environmental studies and environmental monitoring. Use of these devices for ultrafast pulse generation and detection in digital data communications is also envisioned.

Recent advances in terahertz radiation generation can be attributed to optoelectronic interactions in semiconductor photoconductors. The advantage of this mechanism is that pulsed radiation produced by this interaction can be radiated into free space. It is also broadband, and coherent. The beam can be steered using conventional optics to direct it onto samples for analysis, and refracted or reflected to a photodetector operating on the same principle as the generator. Alternatively, in a communications application, the beam would be modulated, transmitted, and received by an electroptic photodetector receiver. A more thorough description of such a device is given by Smith et al, "Subpicosecond Photoconducting Dipole Antennas", *IEEE Journal of Quantum Electronics*, Vol. 24, No. 2, pp. 255–260, February 1988. The device described by Smith et al uses a coplanar stripline terminating in a dipole antenna consisting of a small electrode gap formed over radiation damaged silicon on sapphire. The electrode gap produces the high field photoconductor region. The pump beam was a mode locked dye laser pumped with an argon laser and operating with a pulse duration of 120 fs at 620 nm. The gap forming the high field region is rectangular shaped. The shape of the gap is defined for the purposes of the invention as consisting of the two edges of the metal electrodes and straight lines drawn between the ends of the electrode edge. Thus according to this definition a typical gap, formed by two parallel edges, is bounded by four sides and is rectangular in shape. Smith et al used an optical pump spot of 6 μm focused on a 5 μm gap.

Another terahertz device is described by Van Exter et al in "Characterization of an Optoelectronic Terahertz Beam System", IEEE *Transactions on Microwave Theory and Techniques*, Vol. 38, No. 11, pp. 1684–1691, November 1990. Van Exter et al describe a device that uses a dipole antenna formed in the middle portion of a stripline. The substrate forming the photoconductive region in their device is also silicon on sapphire and they also use a colliding-pulse mode-locked dye laser as the pump source. The electrode gap in the Van Exter et al device is a conventional slot with a rectangular shape according to the definition adopted above, and the spot of the optical pump is focused on two edges of the rectangular gap.

A somewhat more recent analysis of these devices is given by Ralph et al in "Terahertz Beams: Generation and Spectroscopy", *Mat. Res. Soc. Symp. Proc.*, Vol. 261, 1992, pp. 89–100, 1992. Ralph et al analyzed the effect of the semiconductor properties on the electric field profile between the electrodes forming the gap. They found that semi-insulating semiconductors produce enhanced field profiles. The desired semi-insulating property may be obtained through choice of a material with high trap density or traps may be created in a normal semiconductor by ion beam damage. Since the optoelectric interaction that produces the THz radiation occurs at the semiconductor surface the trap density at and near the semiconductor surface is controlling, and ion beam induced traps are at least as effective as material prepared with high trap density. The device of Ralph et al used a semi- insulating substrate (GaAs) and their high field region is formed by relatively widely spaced (80 μm) parallel electrode strips. They found a trap enhanced field effect near the anode of the device and only a small part, the enhanced part, of the gap was pumped and thus active. Again the gap of their device is rectangular in shape according to the definition set forth earlier, and the optical pump spot is incident on one electrode edge of the gap (FIG. 1a, p.90).

A very recent development in this technology was the proposal and demonstration of T-ray imaging by Hu and Nuss and reported in "Imaging with terahertz waves", *Optics Letters*, Vol. 20, No. 16, pp 1716–1718, August 1995. In this T-ray imaging device, both the generation and detection beams (i.e. the beam indent on and the beam transmitted from) the sample are optically gated. This produces a very high signal to noise ratio. In this device both of the aforesaid beams are coherent, thus simplifying the output signal processing.

The terahertz generator/detector in all of these devices is relatively simple in structure. Basically they comprise a semiconductor substrate with electrodes on the substrate and a small gap in the electrodes. With an appropriate DC bias applied to the electrodes a field is established across the gap which produces a small high field photoconductor region at the surface of the semiconductor in the electrode gap. When this region is excited by fast pulses of light, very rapid changes in conductivity occur. In the presence of the DC electric field these changes in conductivity result in ultrafast pulses of electric current through the dipole forming the gap and equally ultrafast bursts of electromagnetic radiation are emitted from the gap region. Much of this radiation is emitted into the substrate and since it has a photon energy well below the direct bandgap of the semiconductor can be collected by suitable lens arrangements on the obverse side of the semiconductor. The radiated beam can be collimated and focused using suitable mirrors, and can be detected by a device operating in a reverse mode to that just described.

Recent studies of these device structures have established that the pulse laser pump can be replaced with two CW laser signals that are wavelength tuned very slightly apart so that when mixed in the active region of the semiconductor/photoconductor they produce a mixing signal also in the THz range.

While advances in these devices have been significant they still operate with a very low conversion efficiency, This limits the dynamic range, signal-to-noise, and detectability of these prior art terahertz beams. Continued advances in the technology of terahertz generators/detectors requires the conversion process to have improved efficiency.

BRIEF STATEMENT OF THE INVENTION

We have analyzed the high field region in the electrode gap of the above described devices and have devised techniques for significantly enhancing the field intensity. We achieve this by inducing localized extreme field concentrations at selected spots in the dipole region. The interaction of these enhanced localized extreme field regions, either singly or preferably when integrated over the whole region, produce a total signal that is greater than that produced by prior art devices. The key to producing the local extreme fields is in the electrode structure forming the gap i.e. the shape of the gap, and the position of the optical pump. The boundary of the gap, according to the broadest aspect of our invention, has at least one sharp feature, and the pump signal is directed on that sharp feature. In a preferred form of our invention the boundary of the gap has a relatively complex shape in comparison to the prior art gaps shapes, and the optical pump signal is incident on one or preferably more than one sharp feature. The term complex is a comparative term and is intended to define any shape that is more complex, i.e. has more sides, than a rectangle. While in normal practice, the sides will be straight, combinations of straight and curved sides can be envisioned.

The most straightforward and thus likely implementation of our invention will have one or more sharp features on the gap edge of the anode, the cathode, or both. The sharp features in the electrode gap concentrate the field lines at the apex of the angle and result in increased effectiveness of terahertz generation/detection when the optical pump signal is made incident on one or more of these sharp features. In the broadest form of our invention the electrode gap geometry is either rectangular of triangular and the optical pump beam is incident on at least one apex of the geometry.

The term sharp feature, for the purpose of this description, means an angle of less than 135 degrees. The angle that constitutes the sharp feature may be the angle found in a normal polygon or may be a re-entrant angle. The alternatives envisioned for this invention, and the definitions of the angles within its scope, may be more easily appreciated from an examination of the Figures below.

DETAILED DESCRIPTION

Figure 1:
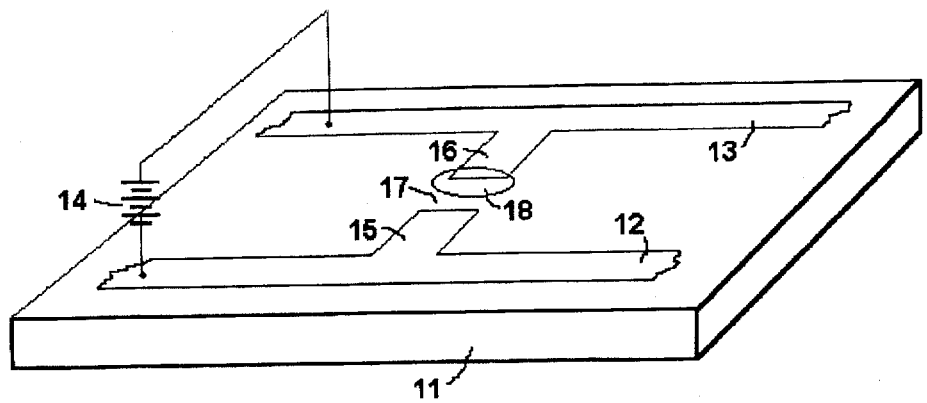
FIG. 1 is a schematic representation of the basic structure of a terahertz generator/detector.

With reference to FIG. 1, the essential elements of a terahertz generator/detector according to this invention are shown in schematic form. Semiconductor substrate 11 is shown with strip electrodes 12 and 13 interconnected with DC bias 14. The dipole members 15 and 16 form an electrode gap 17 which is the active site of the device. Laser spot 18 from the pump laser (not shown) is indent on a portion or all of the gap. Here the pump laser is shown incident on the portion of the gap adjacent the anode of the gap.

The pump source is typically a femtosecond pulse laser operating at a wavelength of 500 nm to 2000 nm and a pulse duration of 10 picoseconds or less. Alternatively it comprises two CW lasers tuned slightly apart and mixed together to give a difference mixing wavelength.

In the usual pump arrangement described in the prior art the pump beam is incident on the top surface of the semiconductor (as it appears in FIG. 1). The generated THz signal radiates in all directions but a large fraction is emitted into the substrate 11 and is collected from the backside or substrate 11. Typically the backside of substrate 11 is equipped with a collimating device, e.g. a high resistivity silicon hyperhemispherical substrate lens (not shown). Although this arrangement has proven to be convenient different configurations can be envisioned. For example, the active region in the electrode gap could be pumped with an optical pulse beam through the semiconductor substrate. The output radiation could be detected from a side location or from the top surface of the substrate.

The material forming the semiconductor substrate may be selected from a wide variety of semiconductor materials since most semiconductors are photoconductive. Silicon and gallium arsenide are most commonly used. The semiconductors may be intrinsic or lightly doped. They may also have high trap densities to reduce carrier lifetime and enhance the electric field across the gap 17. The runners 12 and 13 are typical metallization patterns formed by photolithography. The electrode material may be e.g.. aluminum, titanium-gold, chromium. Selection is not critical. Typical widths for these runners is 10–30 μm. The DC bias 14 is typically 5–200 volts depending on the size of the gap 17. Typical gap lengths, i.e. the spacing between the dipoles 15 and 16, is 3–100 μm. The gap width is comparable. The nominal size of the gap may be chosen to correspond to the aperture of the pump beam. Larger pump beams give higher terahertz beam output. Accordingly it is generally desirable to have the dimensions of gap 17 at least as large as the pump beam. The gap may be larger than the beam, as is the case in the devices described by Ralph et al. In their device the beam is directed only on the anode side of the gap since the electric field is concentrated at that point. In the invention described here, the electric field has similar non-uniformities, and it may be advantageous to direct the pump energy on those spots, i.e. the sharp features, where the field lines are concentrated.

While the descriptions of the prior art devices envision a single pump beam, according to our invention multiple pump beams may be used. They may be directed on the sharp features by simple optics, i.e. lenses or mirrors. In a preferred embodiment they are directed to selected regions of the gap by optical fibers. This embodiment will be described in more detail below.

The aspect of the present invention to be emphasized is the gap geometry. Various options are shown in FIGS. 2–5. In each case the electrode gap has at least one feature that was defined above as a sharp feature.

Figure 2:
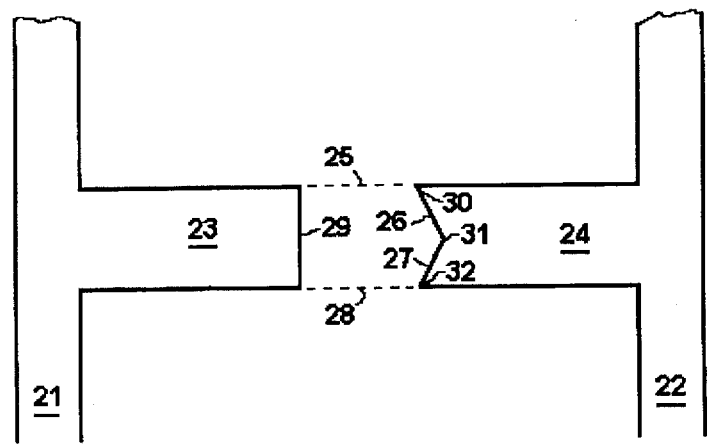
FIGS. 2–5 are diagrams showing various effective geometries for the gap shape of devices of this invention.

The definition of the gap geometry is evident from FIG. 2. The runners are shown at 21 and 22 and the dipole members at 23 and 24. The gap geometry is defined as that region bounded by the sides 25, 26, 27, 28 and 29 in that order. Sides 25 and 29 are imaginary lines connecting the ends of the edges of the gap.

The electrode gap can be further described as having a first edge of a first electrode spaced from and facing a second edge of a second electrode with each of said edges having a first end and a second end, the first and second ends approximately facing one another thus forming therebetween an electrode gap, said electrode gap having a geometric area defined by:

a. the edge of said first electrode, b. an imaginary line connecting the first end of the first edge with the first end of the second edge.

c. the edge of the second electrode, and d. an imaginary line connecting the second end of the first edge with the second end of the second edge, As is evident, the gap geometry shown in FIG. 2 is an irregular pentagon. The gap has three sharp features, the three 120° angles 30, 31 and 32 in addition to the two conventional corners on the gap-forming member 23. Thus it will be appreciated that the added side in this geometry adds a sharp feature to the electric field forming region.

Figure 3:
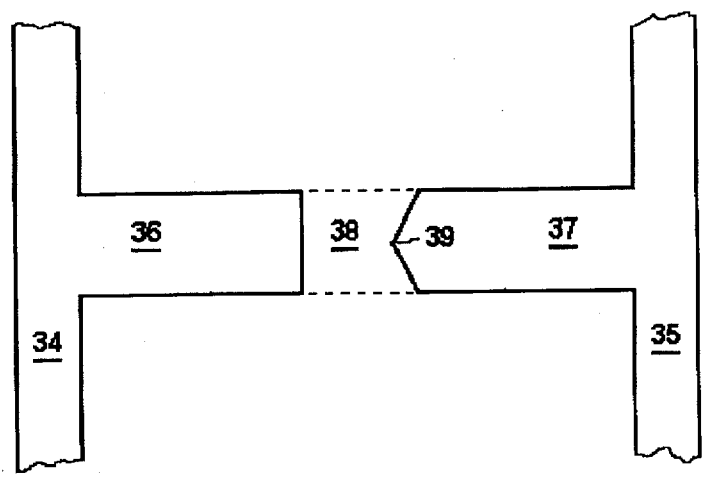
Figure 4:
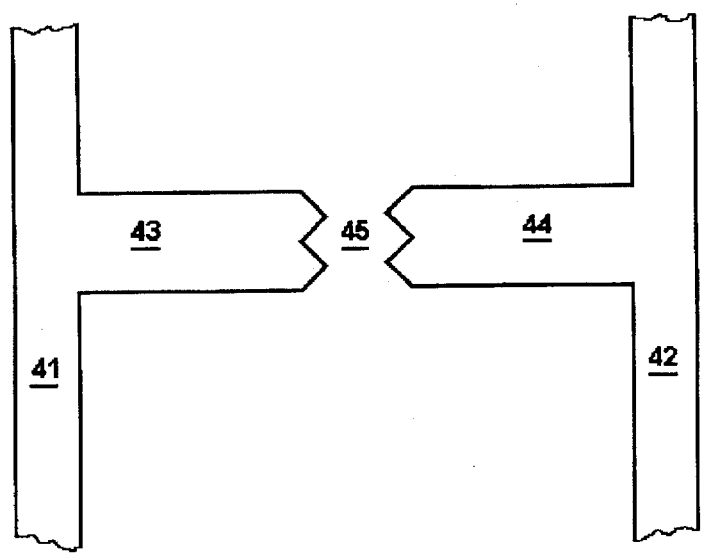
Figure 5:
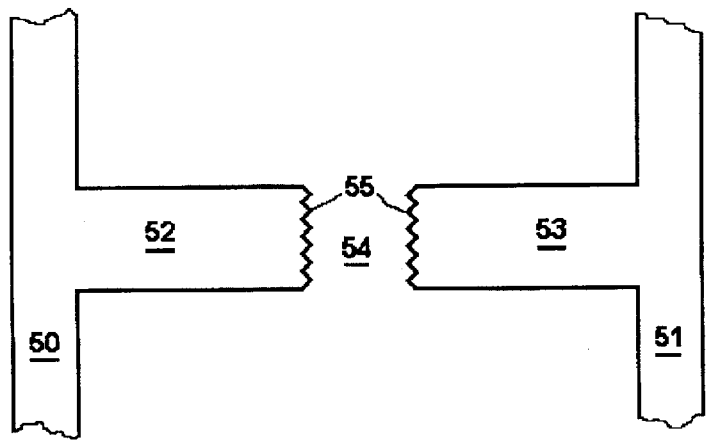

FIG. 2 shows the simplest embodiment of the invention. More likely implementations are shown in FIG. 3–5. FIG. 3 for example shows a gap geometry with a re-entrant angle, and is a preferred embodiment of the invention. In FIG. 3, runners 34 and 35 are shown with dipole stubs 36 and 37 defining an electrode gap 38. The gap geometry here is also five sided but has a re-entrant angle 39 at approximately 120°. The length of the stub sections 36 and 37 are not critical and can in principle be omitted altogether. In such a case the edges of the electrode forming the electrode gap would consist of the two legs of a triangle (forming apex 39) and imaginary lines perpendicular to runner 34. Such a gap would have the same geometry as the one already described in connection with FIG. 3, i.e. a five sided polygon with one re-entrant angle.

FIG. 4 shows a structure that combines both angles of FIGS. 2 and 3 in a sawtooth configuration. Runners 41 and 42 are shown with dipoles 43 and 44 terminating in electrode gap 45. Here the gap geometry has 10 sides and 4 re-entrant angles.

FIG. 5 shows an embodiment similar to that of FIG. 4 with a more complex geometry. It will be evident to those skilled in the art that if the sharp features become too numerous and very close together the field will approximate that at a straight edge thus giving no meaningful field asymmetry. It will also be evident that if multiple pump beams and multiple outputs are desired, as described earlier, the embodiment of FIG. 4 is preferred. Thus from a variety of standpoints it is preferred that the number of sides in the electrode gap geometry be in the range of 5–50, and the number of re-entrant angles be in the range 1–12.

Referring again to FIG. 5 both sawtooth edges are shown straight. It would also be effective if either or both edges were curved as suggested earlier. It should be evident to those skilled in the art that a large number of options are available to the device designer that benefit from the teachings of the invention.

Figure 6:
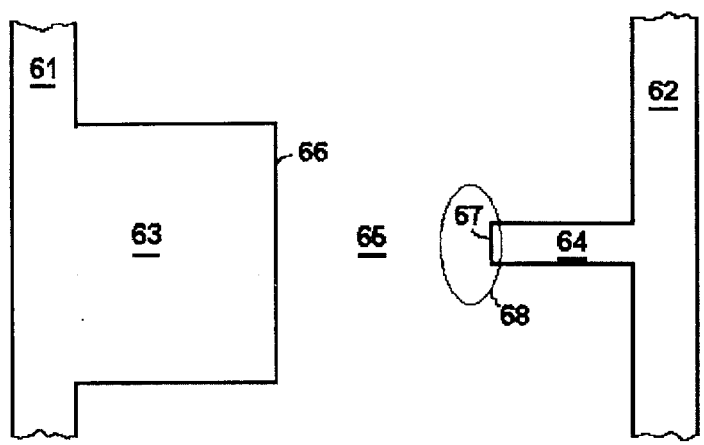
FIG. 6 is a diagram of an electrode gap geometry especially useful in generator/detector structures that have enhanced anode fields.

Yet another general approach to enhancing the electric field in the context of terahertz generator/detector devices is shown in FIG. 6. This embodiment is an improvement over the device described by Ralph et al and referenced earlier. In that device the pump beam is directed at the region of the electrode gap that is adjacent the anode, since the electric field at the anode region is enhanced by the use of high trap density photoconductors. Field enhancement in that device as well as generic devices can be further enhanced by the electrode gap structure shown in FIG. 6. Here runners 61 and 62 are shown with dipole members 63 and 64 terminating in electrode gap 65. Dipole 63 is the cathode dipole and dipole 64 is the anode dipole where the material field enhancement occurs and where the pump beam 68 is directed as shown. The electric field at the anode region is further enhanced by adjusting the electrode gap edge lengths so that the cathode edge 66 is substantially larger than the anode edge 67. To take advantage of this effect it is recommended that the cathode edge be at least twice the length of the anode edge. This electrode gap geometry in this embodiment has a rectangular shape. A variant on the arrangement shown in FIG. 6 is to simply omit the electrode dipole stub 63 leaving just stripline 61. The length of stripline 61 facing the anode edge 67 in such a case would meet the limitation specified, i.e. it would be at least twice the length of the edge of electrode 67. The optical spot 68 is shown overlapping the two corners of the electrode 67 according to the invention. Also according to the invention the spot may overlap a single corner. The electrode end may alternatively be triangular shaped, as illustrated in FIG. 3, with the optical spot incident on the apex of the triangle.

Figure 7:
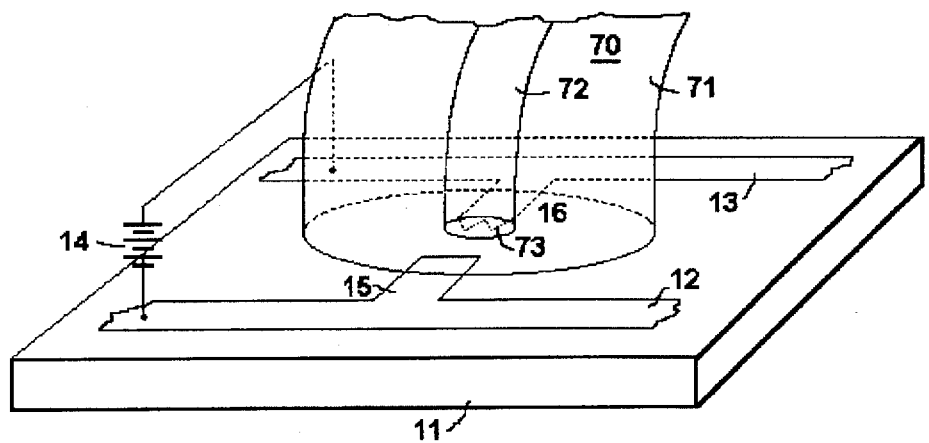
FIG. 7 is a schematic representation similar to FIG. 1 showing the optical pump signal focused on the sharp gap features using an optical fiber.

In FIG. 7 we show the use of an optical fiber 70 for focusing the optical pump spot on the sharp features of the electrode gap. The fiber end that is attached to the semiconductor substrate is stripped of its coating leaving cladding layer 71 and core 72. The core is shown directed onto the sharp features 73 of the electrode 16. The electrode gap geometry in this figure has an anode like the one shown in FIG. 4 and a conventional straight cathode, i.e. a gap having a geometry with 7 sides and four re-entrant angles.

To demonstrate the principle of our invention we fabricated devices with the general structure of FIG. 1. The substrate was low temperature LT-GaAs grown at ~250° C. and later annealed for one minute at 600° C. The metal patterns were fabricated using conventional lithography. The dipole members 15 and 16 were approximately 10 μm wide and the sparing between them was approximately 70 μm. Two metallization schemes were used to make the contacts as nearly ohmic as possible (800 A Au-Ge, 200 A Ni, 200 A Ti, 2000 A Au; 100 A Ni, 800 A Au-Ge, 200 A Ni, 3000 A Au). These metallization schemes do not guarantee ohmic contacts to SI or LT GaAs however none of our devices showed non-linear I–V curves. The pump beam was a mode-locked Ti-sapphire pulsed laser with radiation at 780 nm and pulses at 150 fs. The pump beam was incident on the electrode gap through a 20 X objective with a spatial resolution of ~2 μm. The electrodes were biased at various voltage levels (typically a few tens of volts corresponding to fields up to 50 kV/cm). The generated THz radiation was collected with a pair of off-axis paraboloids and focused on a THz dipole antenna fabricated on LT-GaAs. This antenna was excited by another short laser pulse derived from the same Ti-sapphire laser. The emitted was then scanned two dimensionally and the THz waveforms for each coordinate were recorded by scanning the delay of the bean exiting the antenna. We also performed zero-displacement electro-optic sampling [EOA] measurements in some of these structures.

In our demonstrations we first measured the THz pattern generated using a standard prior art electrode gap geometry, i.e. a gap with four sides, the two electrode edges being parallel, to give a rectangular electrode gap geometry. With a DC bias of 70 volts and the focused optical beam incident on the corner of the anode the radiation pattern showed a peak at the corner which was almost an order of magnitude greater than the radiation level in the rest of the gap geometry (i.e. away from a sharp feature).

To further demonstrate the added enhancement of the invention additional sharp features were incorporated into the electrode gap structure. In one demonstration measurements were taken with the optical pump signal incident on an electrode gap geometry of five sides and one re-entrant angle. The geometry was similar to that shown in the diagram of FIG. 3. The angle of the sharp feature in FIG. 3 is not intended to be precisely to scale but appears to be close to the recommended limit mentioned above, i.e. 135°. We used a gap geometry with an angle (39 in FIG. 3) of approximately 60°. The second pattern was measured on a device with an electrode gap pattern shown in FIG. 4 but with only the anode side shaped with sharp features. This electrode gap geometry has seven sides and two re-entrant angles. In each case we observed strong enhancement of THz radiation due to the sharp features added to the electrode gap geometry. We observed the same behavior for different bias voltages and gap distances between anodes and cathodes.

We also investigated the dependence of the THz scans on incident laser power. Although there are some differences in the measured traces when the incident laser power is varied, the enhancement of the THz emission near the sharp features is still observed when we reduce the laser power by more than two orders of magnitude. Zero-displacement electro-optic sampling measurements in these structures show that the corresponding measured electric fields are higher in the corners as compared to the other anode regions with a ratio comparable to that observed in the scanned THz emission measurements.

While electrical field enhancement at the anode of the dipole is discussed both above and in the prior art (e.g., Ralph et al) similar effects can be expected in other regions of the gap, notably near the cathode. Thus it is within the scope of the invention to reverse the anode and cathode in the embodiments described above.

Various additional modifications of this invention will occur to those skilled in the art. All deviations from the specific teachings of this specification that basically rely on the principles and their equivalents through which the art has been advanced are properly considered within the scope of the invention as described and claimed.

We claim:

1. A device for generating or detecting far infra-red pulsed radiation in the pulse frequency range of $10^{10}$ to $10^{13}$ Hz comprising:

a photoconductor substrate, at least two spaced apart electrodes formed on the surface of the photoconductor substrate thus forming an electrode gap therebetween, DC bias means for biasing said at least two spaced apart electrodes, and optical pump means comprising at least one laser with its output beam indent on said electrode gap, the said electrode gap further defined as having a first edge of a first electrode spaced from and facing a second edge of a second electrode with each of said edges having a first end and a second end, the first and second ends approximately facing one another thus forming therebetween an electrode gap, said electrode gap having a geometric area defined by:

a. the edge of said first electrode, b. an imaginary line connecting the first end of the first edge with the first end of the second edge.

c. the edge of the second electrode, and d. an imaginary line connecting the second end of the first edge with the second end of the second edge, the invention characterized in that the said geometric area has at least five sides.

2. The device of claim 1 in which the photoconductor substrate is a semiconductor substrate.

3. The device of claim 2 in which the optical pump means comprises a pulsed laser with a pulse duration of 10 picoseconds or less.

4. The device of claim 2 further including means for collimating output radiation from the said electrode gap.

5. The device of claim 2 further including means for directing input radiation onto the said electrode gap.

6. The device of claim 5 in which the means for directing input radiation onto the said electrode gap comprises an optical fiber.

7. The device of claim 2 in which the DC bias is in the range of 1-100 volts.

8. The device of claim 2 in which the electrode geometry has at least one re-entrant angle.

9. The device of claim 2 in which the electrode geometry has at least seven sides and at least two re-entrant angles.

10. A device for generating or detecting far infra-red pulsed radiation in the pulse frequency range of $10^{10}$ to $10^{13}$ Hz comprising:

a photoconductor substrate, at least two spaced apart electrodes formed on the surface of the photoconductor substrate thus forming an electrode gap therebetween, DC bias means for biasing said at least two spaced apart electrodes, and optical pump means comprising at least one laser with its output beam spot incident on said electrode gap, the invention characterized in that the output beam spot of the optical pump means overlaps a sharp feature of the said electrode gap, the sharp feature being defined as an edge portion of the electrode having an angle of less than 135 degrees.

* * * * *